2,924,104

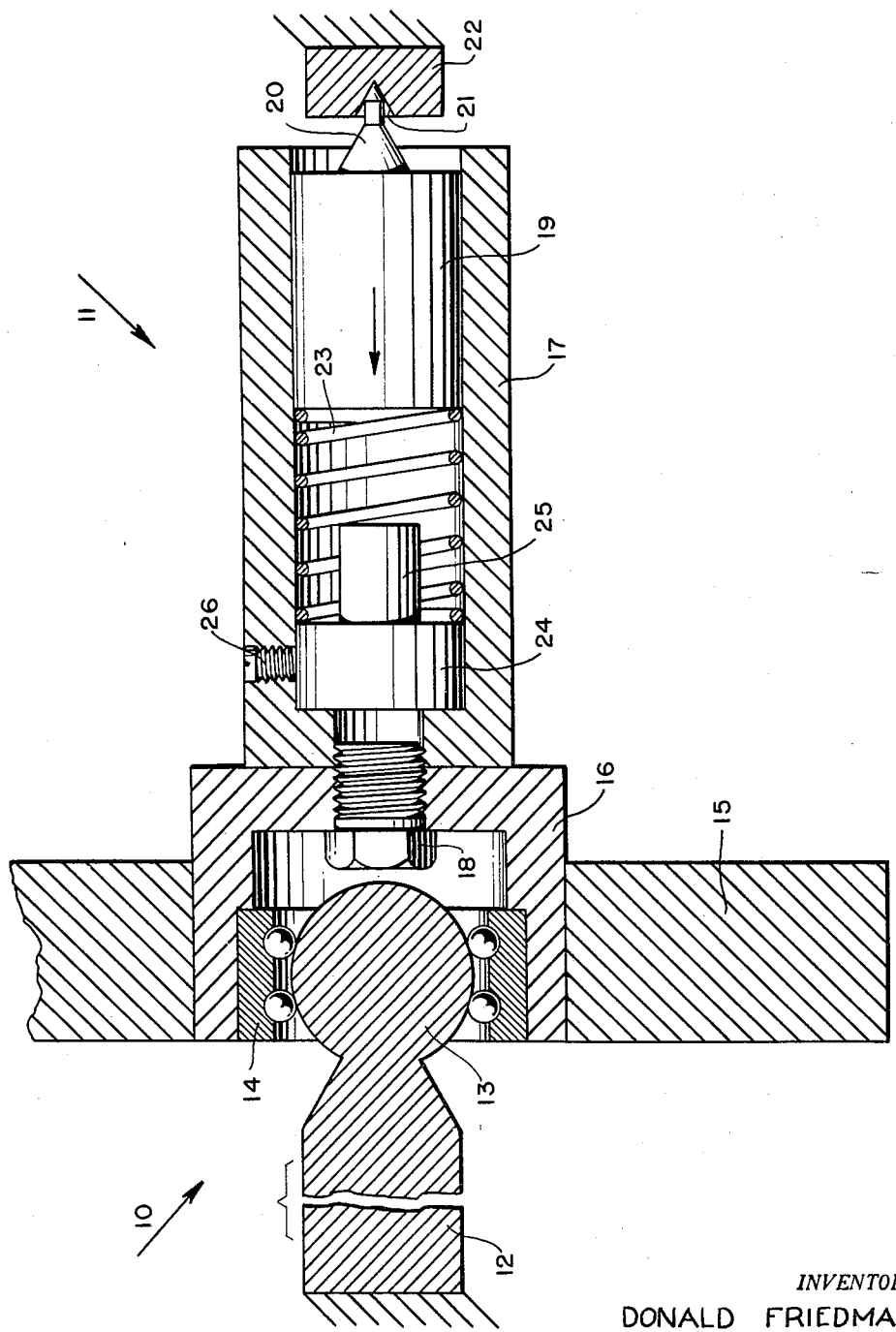

INERTIA ACTUATED GYRO UNCAGING MECHANISM

Donald Friedman, Oakland, N.J., assignor, by mesne assignments, to the United States of America as represented by the Secretary of the Navy Application September 15, 1954, Serial No. 456,346

2 Claims. (Cl. 74—5.12)

The present invention relates to gyroscopic apparatus and more particularly to an inertia actuated gyro caging mechanism.

In certain missiles employing gyroscopically controlled apparatus, it is generally customary to lock the gyro rotor in a fixed position relative to the missile axis during the period of driving the rotor to its normal operating speed and to uncage the rotor upon the latter attaining its running speed whereby to permit the orientation of the rotor relative to the missile to vary. The present invention provides a mechanism for maintaining the gyro rotor caged during acceleration thereof to operating speed which mechanism comprises inertia actuated means for effecting automatic uncaging of the rotor under the action of the acceleration forces arising upon launching of the missile. While the invention is illustrated and described with reference to a gyroscope assembly of the type comprising a supporting shaft having a gyro rotor universally and rotatably mounted on one of its ends, it is to be understood that the invention may be employed with other types of gyro rotor mounts.

In accordance with the foregoing, an object of the invention is the provision of an improved caging mechanism for gyroscopes.

Another object of the invention is the provision of an inertia actuated caging mechanism for gyroscopes.

And a further object of the invention is the provision of an improved inertia actuated caging mechanism for missile-carried gyroscopes wherein the acceleration forces arising upon launching of the missile act to effect uncaging of the gyro.

Other objects and many of the attendant advantages of the present invention will become apparent as the same becomes better understood from the following detailed description had in conjunction with the annexed drawings wherein the single figure illustrates in longitudinal cross-section a gyroscope assembly embodying the present caging mechanism.

Referring now to the drawing, 10 denotes a gyroscope device incorporating the caging mechanism 11 of the present invention. Gyroscope 10 comprises a supporting shaft 12 which is rigidly fixed at one end to some supporting structure, as illustrated, and has formed on its other end a substantially spherical portion 13. Universally and rotatably mounted on spherical portion 13, as by means of a ball bearing assembly 14 having a double ball race, as illustrated, is a gyro rotor 15 having a central hollow hub portion 16 in which is fixed the bearing assembly 14. Caging mechanism 11 comprises a cylindrical housing 17 which is secured to hub portion 16, in coaxial relation with the rotor, as by means of a bolt 18 received in threaded apertures formed in opposing end walls on the hub portion and housing. Slidably disposed in housing 17 for movement along the gyro rotor axis is an inertial mass in the form of a permanently magnetized plunger 19. Plunger 19 has formed on its outer end a generally conical shaped projection or detent 20 which, in the extended position of the plunger 19 shown, projects beyond the outer end of housing 17 and is adapted to be received in a recess 21 formed in the fixed supporting structure 22 for caging the gyro assembly. A compression spring 23, abutting at one end the plunger 19 and at the other end a generally disc shaped body 24 disposed within housing 17 at the inner end thereof, serves to bias plunger 19 to its extended position illustrated. Fixed to or formed integrally with body 24 is a second permanently magnetized element 25, the adjacent ends of magnets 19 and 25 being of opposite polarity. A set screw 26 threaded in the wall of housing 17 and engaging body 24 serves to retain the latter in a fixed position within housing 17. The above described assembly is mounted within the missile with the axis of the assembly, in the caged condition of the gyro, disposed on or parallel to the missile axis and with the caging device 11 extending forwardly.

The operation of the above described assembly in a missile of the type in which it is primarily intended to be employed is as follows. Prior to launching of the missile, the gyro rotor is manually caged and is driven to its normal operating speed by some suitable driving means, not shown. Upon launching of the missile, the resultant acceleration force acting on magnetized plunger 19 causes movement of the latter toward magnet 25. Since magnetic forces are inversely proportional to the square of the distance between magnets, the force of attraction of plunger 19 to magnet 25 becomes substantially greater as plunger 19 is moved toward magnet 25 under the force of acceleration. The magnetic strengths of the plunger 19 and the magnet 25 are made such that upon movement of the plunger into contact with magnet 25, the force of attraction becomes sufficient to maintain the plunger retracted and, therefore, the gyro uncaged during subsequent deceleration of the missile.

Obviously, many modifications and variations of the present invention are possible in the light of the above teachings. It is therefore to be understood that within the scope of the appended claims, the invention may be practiced otherwise than as specifically described.

What is claimed is:

1. A gyroscopic device comprising a body adapted to be accelerated in a given forward direction, said body including a first support means and a second support means spaced forwardly of said first support means, a gyro rotor rotatably and universally mounted on said first support means, a cylindrical housing fixed to the rotor coaxially therewith and extending forwardly thereof, a plunger slidably disposed in said housing and including a detent element on its outer end, said plunger being movable along the rotor axis from a forward extended position wherein said detent element is received in a recess formed in said second support means to cage the rotor, to a retracted position in which the gyro is uncaged, spring means in said housing for biasing said plunger to its extended position, the force acting on said plunger as a result of forces caused by acceleration of said body causing movement of the plunger to its retracted position, and means for retaining the plunger in its retracted position.

2. A gyroscopic device comprising a body adapted to be accelerated in a given forward direction, said body including a first support means and a second support means spaced forwardly of said first support means, a cylindrical housing fixed to the rotor coaxially therewith and extending forwardly thereof, a magnetized plunger slidably mounted in the housing for movement along the rotor axis from a forward extended position to a retracted position, said plunger having a coaxial detent element formed on its outer end, which element in the said extended position of the plunger is engageable in a recess formed in said second support means for caging the rotor, a spring in said housing for biasing said plunger to said extended position, the force acting on said plunger as a result of acceleration of said body causing movement of the plunger toward its retracted position, a magnet fixed within the housing, adjacent ends of said plunger and magnet being of opposite polarity, the magnetic attraction between said magnet and plunger upon the latter being moved into contact under the force of acceleration being sufficient to maintain the plunger permanently retracted against the pressure of said spring.

References Cited in the file of this patent

UNITED STATES PATENTS

| | | |
|---|---|---|
| 1,955,746 | Inglis | Apr. 24, 1934 |
| 2,202,955 | Langgasser | June 4, 1940 |